No. 897,589. PATENTED SEPT. 1, 1908.
W. L. CONNEVEY.
FISH TRAP.
APPLICATION FILED JAN. 5, 1907. RENEWED JUNE 13, 1908.
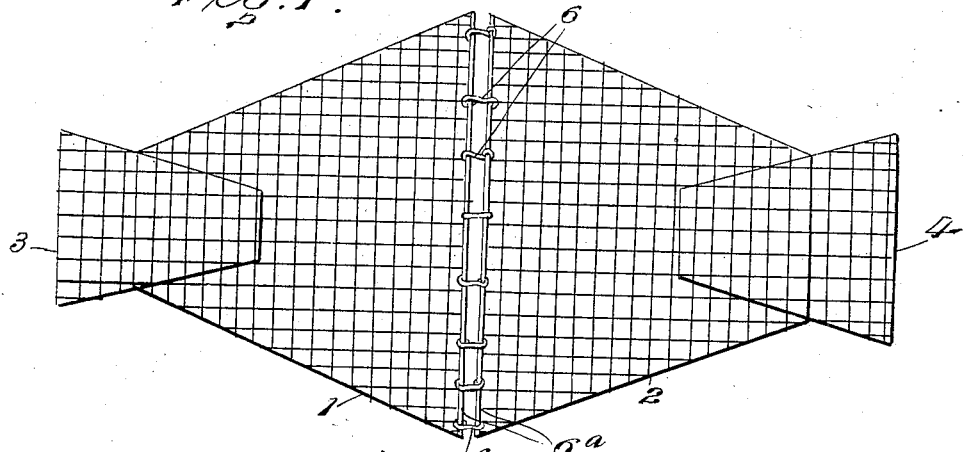
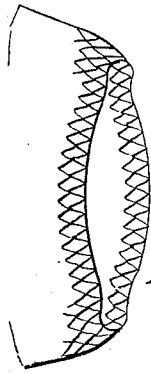 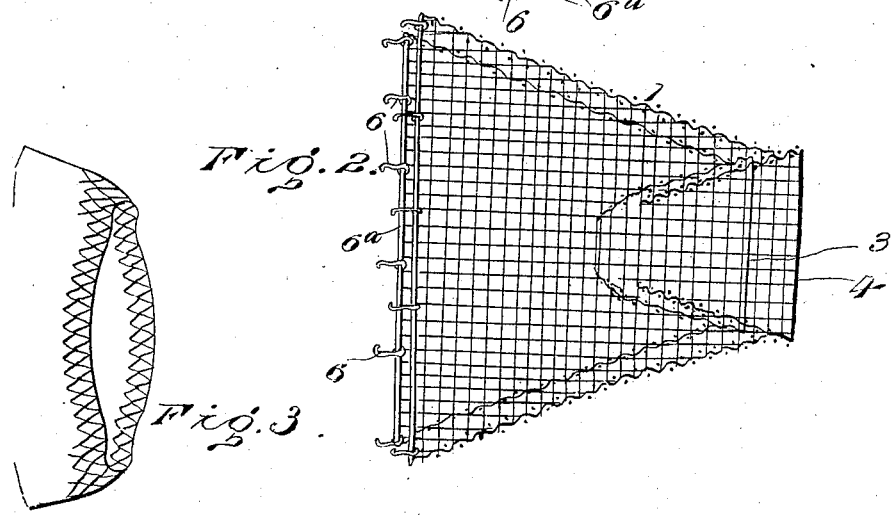
Inventor
W. L. Connevey.
By R. H. A. P. Lacey,
Attorneys
Witnesses
W. N. Woodson
A. T. Measer

UNITED STATES PATENT OFFICE.

WILLIAM L. CONNEVEY, OF LEWISVILLE, ARKANSAS.

FISH-TRAP.

No. 897,589. Specification of Letters Patent. Patented Sept. 1, 1908.

Application filed January 5, 1907, Serial No. 350,942. Renewed June 13, 1908. Serial No. 438,412.

*To all whom it may concern:*

Be it known that I, WILLIAM L. CONNEVEY, citizen of the United States, residing at Lewisville, in the county of Lafayette and State of Arkansas, have invented certain new and useful Improvements in Fish-Traps, of which the following is a specification.

This invention contemplates certain new and useful improvements in fish traps, and the object of the invention is to provide a wire fish trap which is composed of sections that may be conveniently secured together in operative relation and also be nested one within the other whenever it is desired, the said sections, when in operative position providing oppositely facing entrance openings so that the fish may enter the trap when coming in either direction.

The invention consists in certain constructions and arrangements of the parts hereinafter fully described and claimed.

For a full description of the invention and the merits thereof and also to acquire a knowledge of the details of construction of the means for effecting the result, reference is to be had to the following description and accompanying drawings, in which:

Figure 1 is a side elevation of one form or embodiment of my invention. Fig. 2 is a similar view, showing the two traps detached and one nested within the other. Fig. 3 is a detail fragmentary view of the inner end of one of the entrance openings or funnels.

Corresponding and like parts are referred to in the following description and indicated in all the views of the drawings by the same reference characters.

Referring to the drawing, the numerals 1 and 2 designate the two sections of my improved fish trap which may be of any desired shape or design, although they are preferably in the form of truncated cones and are composed of wire mesh as indicated. Each section is provided with an entrance opening or funnel which is also constructed of wire mesh and which is secured in any desired way well known in wire working to the smaller end of its respective section, so as to project partly outside of such smaller end and partly into the section. These entrance openings or funnels are designated 3 and 4, respectively. They are preferably circular at their larger and outer ends and their inner ends, inside of their respective sections, are flattened and bent inwardly so as to produce narrow or contracted throats leading into the interior of the sections 1 and 2.

When two sections are used as illustrated, they are secured together by means of hooks 6 which are attached in alternate arrangement to the substantially rigid wire rims 6ª at the respective larger ends of the sections 1 and 2, the said hooks merely looping around the rims as shown.

From the foregoing description in connection with the accompanying drawing, it is evident that the fish may enter my improved trap from either end thereof and as the inner ends of the funnels 3 and 4, where they are contracted, as above described, are formed of very light and flexible wire, it is manifest that the fish may readily find access into the interior of the section by brushing past the inner contracted ends of the funnels 3 or 4, while after once entering the sections 1 and 2, the fish cannot escape, because the slightest pressure in an outward direction upon the inner ends of the funnels will completely close such ends.

It will be seen that the sections 1 and 2 may be readily detached from each other and nested one within the other so as to occupy comparatively little space for convenience in transportation, handling, or storage. It is to be understood that the sections 1 and 2 may be of any size and of any size mesh. It is also to be understood that one of the sections of the trap may be used if desired, by merely closing the larger end thereof. It will also be seen that my invention provides a large roomy body for the trap and double entrance openings affording double capacity of the single entrance traps, thereby increasing the catch, and that it embodies the feature of being loose and bending in any direction in the middle where the two rims are loosely connected together by the hooks, thereby permitting the trap to accommodate itself to the shape of the bottom of the stream. Furthermore, any number of intermediate sections may be easily attached and detached so as to make the trap of any length, size or shape desired.

Having thus described the invention, what is claimed as new is:

A fish trap comprising a plurality of sections, each of which is provided with a rigid wire rim, hooks pivotally secured to the respective rims and designed for detachable engagement with the opposite rim, whereby the sections are yieldingly held together so as to accommodate themselves to the bottom of the stream, said sections being provided with entrance funnels projecting partly within and partly outside of the outer ends of the sections with the smaller ends innermost, the said smaller ends of the funnel being flattened and bent inwardly whereby to form contracted throats leading into the interior of the sections.

In testimony whereof I affix my signature in presence of two witnesses.

WILLIAM L. CONNEVEY. [L. S.]

Witnesses:
NEWTON J. YARBROUGH
PERRY LAMBETH.